(12) United States Patent
Gagne et al.

(10) Patent No.: US 8,777,035 B2
(45) Date of Patent: Jul. 15, 2014

(54) WALL MOUNTING APPARATUS AND METHOD

(75) Inventors: Jean-Guy Gagne, Etobicoke (CA); James W. Rogers, Toronto (CA)

(73) Assignee: Brainwave Research Corporation, Ontario (CA)

(*) Notice: Subject to any disclaimer, the term of this patent is extended or adjusted under 35 U.S.C. 154(b) by 351 days.

(21) Appl. No.: 13/101,758

(22) Filed: May 5, 2011

(65) Prior Publication Data

US 2012/0279148 A1 Nov. 8, 2012

(51) Int. Cl.
*B65D 6/28* (2006.01)

(52) U.S. Cl.
USPC ............ 220/4.02; 220/3.3; 220/3.5; 220/3.94

(58) Field of Classification Search
USPC .......... 220/4.02, 3.3, 3.5, 3.6, 3.9, 3.92, 3.94; 174/57, 58
See application file for complete search history.

(56) References Cited

U.S. PATENT DOCUMENTS

| | | | | |
|---|---|---|---|---|
| 1,490,252 | A | * | 4/1924 | Bissell ............................ 220/3.6 |
| 2,788,187 | A | * | 4/1957 | De Mont et al. ............. 248/27.1 |
| 2,842,281 | A | * | 7/1958 | Chisholm ....................... 220/3.6 |
| 2,891,755 | A | | 6/1959 | Clark |
| 3,168,613 | A | * | 2/1965 | Palmer ............................ 174/50 |
| 3,729,572 | A | * | 4/1973 | Helin .............................. 174/66 |
| 3,749,815 | A | * | 7/1973 | Boatwright et al. ............ 174/66 |
| 3,864,512 | A | * | 2/1975 | Meadow ......................... 174/66 |
| 4,027,097 | A | * | 5/1977 | Gillemot ......................... 174/66 |
| 4,087,624 | A | * | 5/1978 | Hitchcock ....................... 174/57 |
| 4,108,414 | A | * | 8/1978 | Grant, Sr. ....................... 248/300 |
| 4,183,486 | A | * | 1/1980 | Esoldi ........................... 248/27.1 |
| 4,685,035 | A | * | 8/1987 | Nanjoh ......................... 361/829 |
| 4,840,584 | A | | 6/1989 | Cox |
| 4,847,444 | A | | 7/1989 | Holland |
| 4,863,399 | A | * | 9/1989 | Medlin, Jr. ..................... 439/538 |
| 4,892,212 | A | * | 1/1990 | Andreyko ....................... 220/3.3 |
| 4,955,825 | A | * | 9/1990 | Groth et al. .................... 439/535 |
| 5,044,987 | A | * | 9/1991 | Tihanyi .......................... 439/560 |
| 5,158,478 | A | * | 10/1992 | Schuplin ........................ 439/538 |
| 5,211,580 | A | * | 5/1993 | Schuplin ........................ 439/538 |

(Continued)

FOREIGN PATENT DOCUMENTS

DE 197 35 703 A1 2/1999
GB 2 168 206 A 6/1986

OTHER PUBLICATIONS

International Search Report for PCT/CA2012/000382 dated Sep. 14, 2012, 4 pages.

(Continued)

*Primary Examiner* — Fenn Mathew
*Assistant Examiner* — Christopher McKinley
(74) *Attorney, Agent, or Firm* — Ditthavong & Steiner, P.C.

(57) ABSTRACT

A self-supporting apparatus can be placed in a pre-set opening in an existing wall substrate. A frame assembly is configured with a perimeter that corresponds to the thickness of the wall substrate. The edge of the frame thus can be in fitting contact with the substrate opening. Flanges on opposite sides of the frame extend in the planar direction of the wall substrate to be in contact with the inner and outer surfaces of the substrate to maintain the frame in position in the wall and to strengthen the structure. The frame can include appropriate mounting portions for mounting electrical boxes or low voltage devices within the wall.

12 Claims, 18 Drawing Sheets

(56) References Cited

U.S. PATENT DOCUMENTS

| | | | | |
|---|---|---|---|---|
| 5,223,673 A | * | 6/1993 | Mason | 174/53 |
| 5,378,854 A | * | 1/1995 | Hoover | 174/53 |
| 5,542,859 A | * | 8/1996 | Ison et al. | 439/536 |
| 5,775,032 A | * | 7/1998 | Lacy | 52/28 |
| 5,828,002 A | * | 10/1998 | Fedun | 174/58 |
| 6,093,890 A | * | 7/2000 | Gretz | 174/58 |
| 6,102,360 A | | 8/2000 | Clegg et al. | |
| 6,180,879 B1 | * | 1/2001 | Gretz | 174/50 |
| 6,369,322 B1 | * | 4/2002 | Gretz | 174/50 |
| 6,376,770 B1 | | 4/2002 | Hyde | |
| 6,576,837 B1 | * | 6/2003 | Pimentel | 174/58 |
| 6,769,562 B2 | * | 8/2004 | Schroeder | 220/3.5 |
| 6,906,260 B2 | * | 6/2005 | Grendahl | 174/66 |
| 6,931,794 B1 | * | 8/2005 | Burgess | 52/27 |
| 7,019,211 B2 | | 3/2006 | Rose | |
| 7,112,744 B1 | * | 9/2006 | DeCosta | 174/66 |
| 7,151,218 B2 | * | 12/2006 | Dinh | 174/58 |
| D548,572 S | * | 8/2007 | DeCosta | D8/353 |
| 7,319,192 B1 | * | 1/2008 | Gretz | 174/58 |
| 7,322,860 B2 | * | 1/2008 | Martich et al. | 439/676 |
| 7,554,036 B1 | * | 6/2009 | DeCosta | 174/66 |
| 7,595,446 B2 | | 9/2009 | Turcovsky et al. | |
| 7,645,936 B2 | * | 1/2010 | Magno, Jr. | 174/53 |
| 7,677,503 B2 | * | 3/2010 | Michaud et al. | 248/27.1 |
| 7,692,094 B1 | * | 4/2010 | DeCosta | 174/66 |
| 7,759,576 B1 | | 7/2010 | Gretz | |
| 8,076,577 B2 | * | 12/2011 | Mango et al. | 174/53 |
| 8,109,401 B2 | * | 2/2012 | Davis | 220/4.02 |
| 8,324,503 B2 | * | 12/2012 | Pastoriza et al. | 174/135 |
| 8,350,153 B1 | * | 1/2013 | DeCosta | 174/66 |
| 2002/0096979 A1 | | 7/2002 | Johonson | |
| 2010/0084155 A1 | * | 4/2010 | Jafari | 174/58 |
| 2011/0259883 A1 | * | 10/2011 | DeCosta | 220/3.94 |

OTHER PUBLICATIONS

Written Opinion for PCT/CA2012/000382 dated Sep. 14, 2012, 6 pages.

* cited by examiner

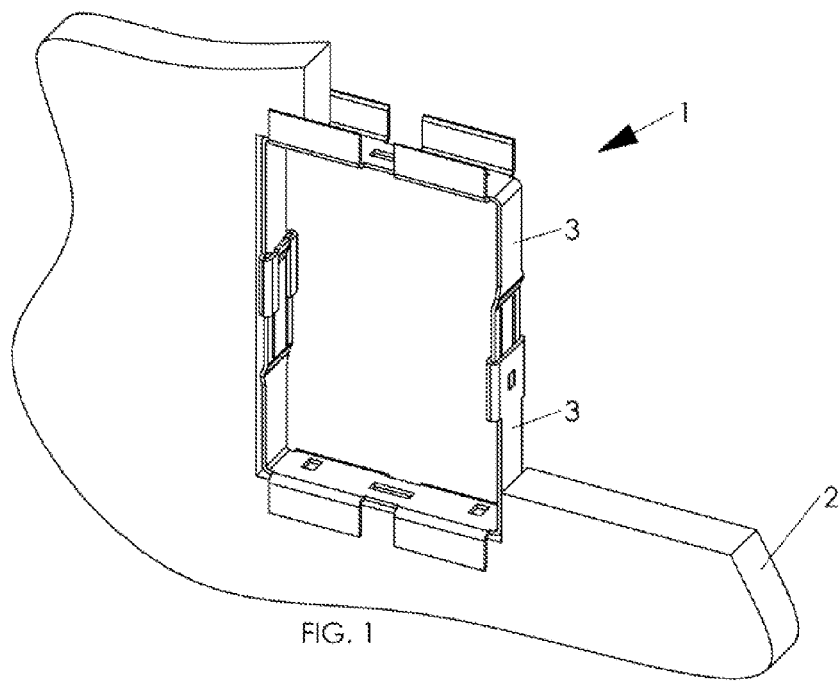
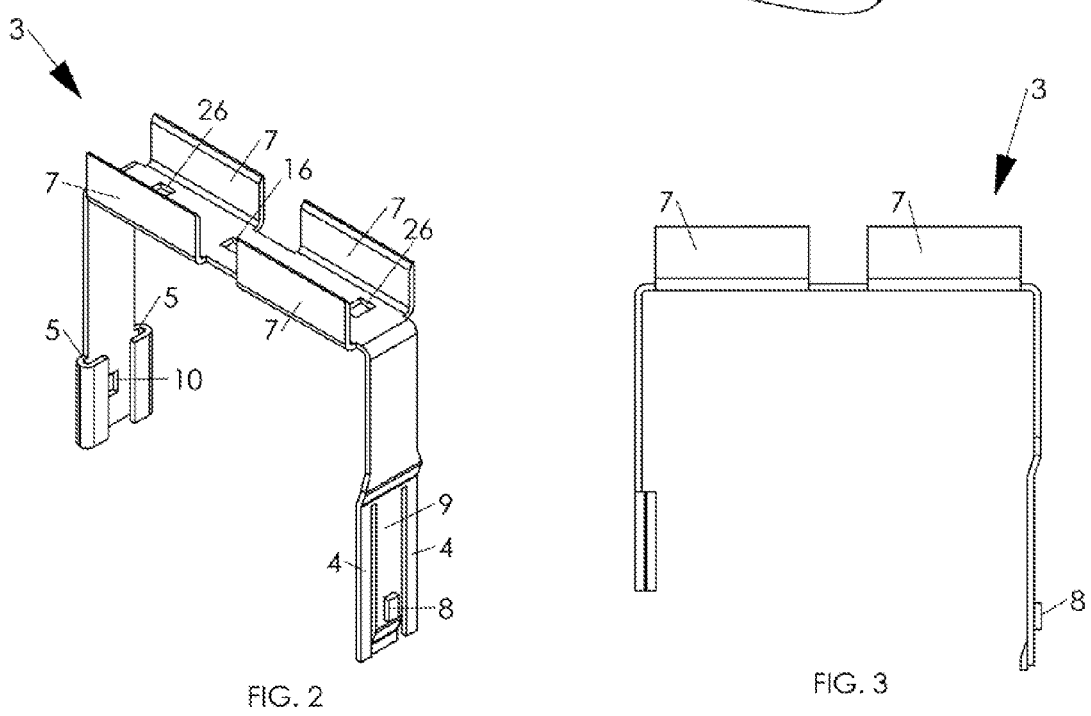

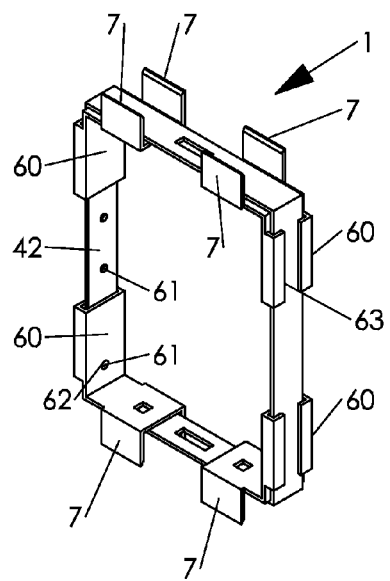
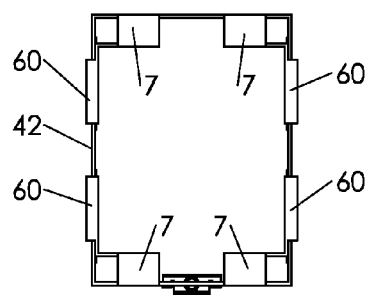
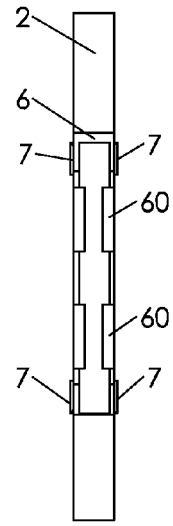
FIG. 21a    FIG. 21b    FIG. 21c
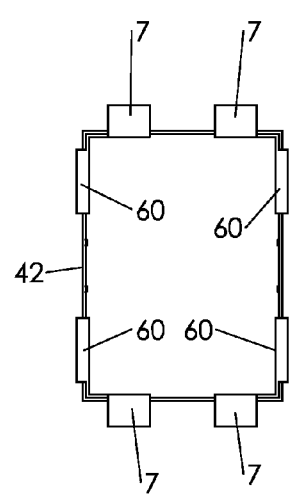
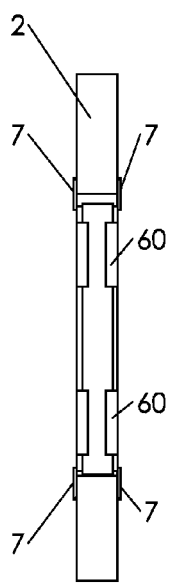
FIG. 21d    FIG. 21e

WALL MOUNTING APPARATUS AND METHOD

BACKGROUND

This disclosure is related to installation of electrical components in building structures, more particularly, to installation of electrical boxes, low voltage devices and the like in existing building walls.

Electrical switches and receptacles require electrical boxes to meet existing electrical codes. In new house or building construction, boxes typically are attached to wall studs or joists before drywall or equivalent sheet material is applied to enclose the wall space. Openings can be cut in the sheet material to accommodate the boxes to be mounted in known positions.

For retrofitting applications that require addition of electrical or low voltage device access to pre-existing building walls at new locations, a certain experience and skill set is required for installation. A new opening must be made in the existing wall substrate. The electrical box or low voltage device must be securely attached to the wall substrate as there is no readily available opportunity to mount the box to a closed wall stud. Attachment of the box to the wall substrate is labor intensive.

A need thus exists for a device that can adequately support an electrical box or low voltage device at a new location of an existing wall substrate. Such device should facilitate installation, both in speed and ease of installation.

SUMMARY OF DISCLOSURE

The needs described above are fulfilled, at least in part, by use of a self-supporting apparatus that can be placed in a pre-set opening in an existing wall substrate. A frame is configured with a perimeter edge that corresponds to the thickness of the wall substrate. The edge of the frame thus can be in fitting contact with the substrate opening. Flanges on opposite sides of the frame extend in the planar direction of the wall substrate to be in contact with the inner and outer surfaces of the substrate to maintain the frame in position in the wall and to strengthen the structure. The frame can include appropriate mounting portions for mounting electrical boxes or low voltage device within the wall.

Various flange arrangements may be utilized. For example, the flanges may be integral with the frame and project therefrom for contact with inner and outer wall surfaces. In another example, a flange may be comprised of a leaf spring that is biased for contact with the inner wall surface. The spring may be held to clear the wall opening when the frame is inserted and then released thereafter. A coil spring may be used as a spring loaded retainer biased for contact with the inner wall surface.

In another example, a flange can be coupled with a pivot arm mounted to an inner surface of the frame. The flange may be positioned within the frame perimeter until the frame is inserted in the wall opening. Thereafter, the flange may be pivoted to an extended position to be in engagement with the inner wall surface. Alternatively, track channels mounted on opposite sides of the frame may each be engageable with a curved retainer portion which can be positioned to apply pressure to the inner wall surface.

In another example, flanges can project from frame members that can be slid along sides of the frame. Prior to insertion of the frame in the opening, the slidable members can be positioned so that the flanges are located within the frame perimeter. After insertion, the slidable frame members can be moved to positions along the frame in which the flanges extend beyond the frame perimeter. The projected flanges can be retained in the extended positions by a detent arrangement or equivalent.

The frame may be sized to accommodate one or more electrical boxes. Mounting tabs integral with the frame may be configured to receive fasteners, for example threaded fasteners, for engagement with one or more electrical boxes. Weakened areas in the tabs may be provided to facilitate separation from the frame of any tabs that are not required. Alternatively, the frame may contain apertures for mounting engagement with spring clips fixed to one or more electrical boxes. In another alternative, tabs inserted in slots in the top and bottom edges of the frame extend within the perimeter of the frame for connection with the electrical component. The tabs may comprise flexible material that is compressible for insertion into and removal from the slots. After insertion the tabs expand for capturing the tabs in the inserted positions.

The frame may additionally contain one or more protruding elements for contact with one or more electrical boxes. The protruding elements serve to appropriately position the boxes within the wall. The protruding elements and the frame may comprise electrically conductive material, the frame thereby being grounded to the electrical boxes.

The frame may be expandable to provide a wedge fit with the wall opening or may be adjustable to provide tight tolerance with the opening. An expandable frame embodiment includes first and second channel and tongue side elements in nesting relationship. Before insertion in the wall opening the side elements can be nested in a position in which the frame is longitudinally contracted so that flanges attached to upper and/or lower edges of the frame are within a contour of the wall opening. Upon insertion of the frame in the wall opening, the frame members can be expanded to fit the frame perimeter with the opening contour, the flanges then extending beyond the frame perimeter for contact with the wall surface. To maintain this frame configuration, the side elements can be provided with holes for engagement with detents on opposite sides.

In an alternative arrangement, the frame may comprise an interlocking hinge structure on opposite sides. Inward pressure on the sides of the frame with consequent inward bending of the sides will cause the height of the frame to contract. The frame will then have sufficient clearance for easy insert in the wall opening. Upon release of the bending pressure, the height of the frame returns to its heightened state for a tight fit with the wall opening contour. In lieu of a hinged structure, the frame may be comprised of an elastomeric material for reducing the frame dimension when compressed and returning the frame to its normal position by when expanded.

An installer thus is not restricted to a specific location or size of opening to be placed in an existing building wall for providing electrical or low voltage device access. An opening of desired size and location can be created. A frame can be provided with a perimeter sized for contact with the created wall opening. Various mounting arrangements can be provided for attaching electrical boxes or low voltage devices are contemplated.

Insertion of the frame in the wall opening so that flanges of the frame extend in contact with both sides of the wall substrate can be accomplished in several ways.

Use of frame formed of elements in slidable nesting relationship with each other permit adjustment of the frame dimension in a planar direction. Prior to insertion, the elements can be set to a nested position in which extend frame flanges are within the wall opening contour. The frame in this nested position can then be inserted in coplanar relationship in the wall opening. The slidable elements can then be extended from their nesting position to an extended position in which the frame perimeter is in tight contact with the wall opening periphery and the flanges extend in the planar direction outwardly from the wall opening. The frame elements can then be locked in the extended position. Electrical or low voltage devices can then be inserted into the wall opening through the frame and mounted thereto.

Frames may be formed of integral material with perimeters corresponding in dimension with the wall opening. With elastomeric flanges extending from only one side of the frame, the frame can be inserted by placing that side in contact with the corresponding wall opening portion, the flanges extending on inner surfaces of the wall. The frame can then be wedged into the opening by pivoting the frame about the side already in contact with the wall opening. Retainers can then be adjusted to maintain and strengthen the frame installation.

BRIEF DESCRIPTION OF DRAWINGS

Various exemplary embodiments are illustrated by way of example, and not by way of limitation, in the figures of the accompanying drawings in which like reference numerals refer to similar elements and in which:

FIG. 1 is a perspective view of a preferred embodiment of a frame assembly installed in an opening in a partially cut away wall;

FIG. 2 is a perspective view of one frame element of the embodiment of FIG. 1;

FIG. 3 is an elevation view of the frame element shown in FIG. 2;

FIGS. 21a-20e exemplify another alternative frame assembly arrangement;

DETAILED DISCLOSURE

Figure 4:
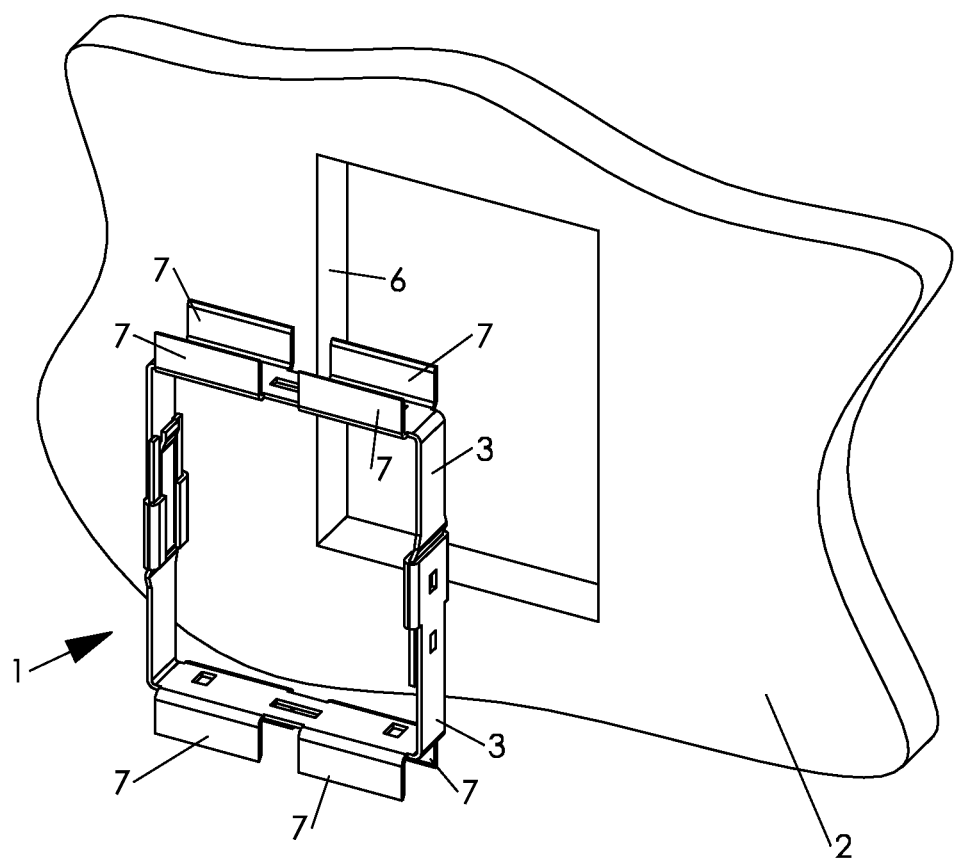
FIG. 4 is a perspective view of the embodiment of the frame assembly of FIG. 1, shown in a compressed state prior to installation in the opening in the wall.

In FIG. 1, frame assembly 1 is shown mounted in a cut away sheet of drywall 2. The drywall opening can be prepared with a drywall saw. The frame assembly comprises two frame elements 3 that together can be adjusted to define a perimeter that fits the contour of the drywall opening. The depth of the frame corresponds to the depth of the drywall.

Both frame elements may be identical, as represented more particularly be a frame element perspective view in FIG. 2 and an elevation view in FIG. 3. For clarity of illustration, only the upper frame element 3 of FIG. 1 is shown. Frame element 3, of U-shaped configuration, can be stamped and formed out of metal, for example, galvanized sheet metal. Of course, any other suitable material can be used to form the frame elements. Flanges 7 extend upwardly from the top edges of frame element 3. The frame element sides are of unequal length. The shorter side terminates in a track channel 5. Aperture 10 is formed in the side of the frame element proximate the track channel 5. The longer side terminates in a cantilever 9, having raised tongues 4 thereon. A detent 8 is positioned between tongues 4 near the bottom of cantilever 9 on its outer side. Holes 16 and 26 on the top of the frame element permit fixing an electrical component to the frame element. The bottom frame element 3 shown in FIG. 1 is of similar configuration, its flanges extending downwardly.

The frame assembly shown in FIG. 4 is in a compressed form prior to insertion into the opening 6 in the drywall. The tongues 4 of each frame element 3 are inserted into the tracks 5 of the other. Once positioned in the opening, the two frame elements 3 are slid apart wedging opposing flanges 7 on the drywall 2 on the top and bottom of the opening. When the frame elements 3 are fully expanded, detent 8 on the cantilever 9 snaps into the aperture 10 on the opposing part, locking the frame assembly in place. The flanges 7 are spaced apart an amount that depends on the thickness of the drywall. Upper and lower flanges 7 on both frame elements serve to maintain the position of the frame within the wall opening as well as to wedge the wall within the flanges.

Figure 5:
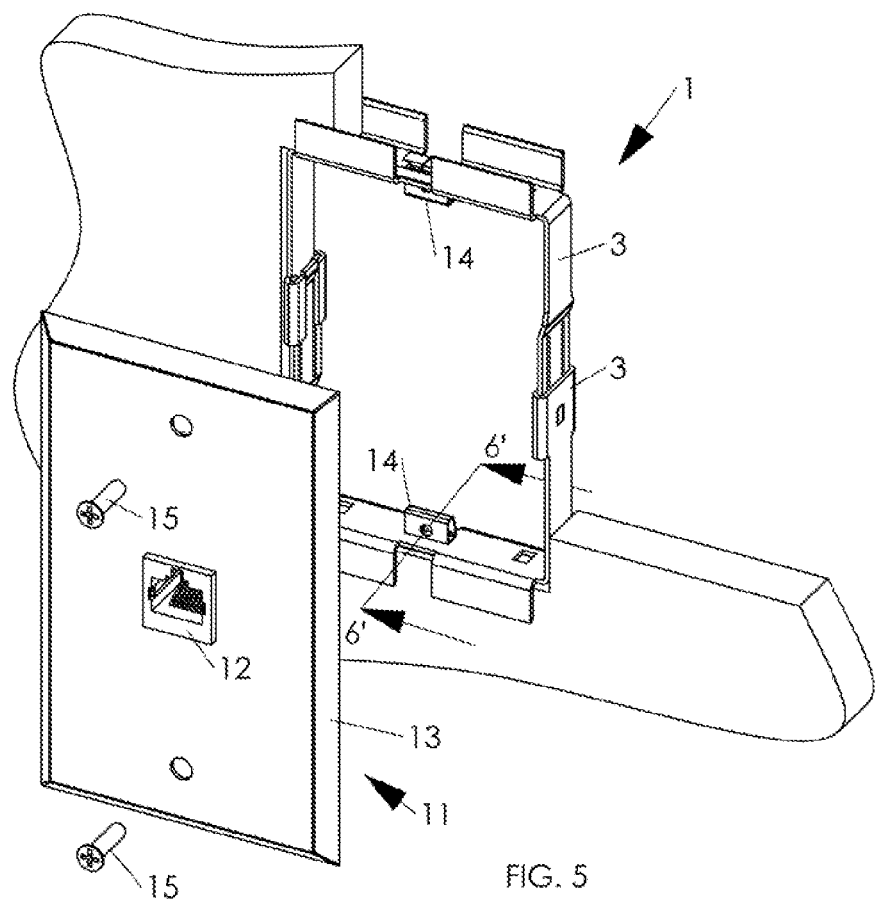
FIG. 5 is a perspective exploded view of a preferred embodiment of the frame assembly serving as a mounting bracket for a telecom connector.

FIG. 5 exemplifies use of the frame assembly 1 as a mounting bracket for a low voltage connector 11. Mounting tabs 14 have been inserted into slots 16 on the top and bottom of the frame assembly. The mounting tabs 14 may comprise, for example, a sheet metal material. A jack female connector 12 is shown snapped into a wall plate 13. A cable connection to the jack 12 is made prior to insertion into the wall plate 13. Although illustrated as a female connector, jack 12 is representative of any low voltage device.

Figure 6:
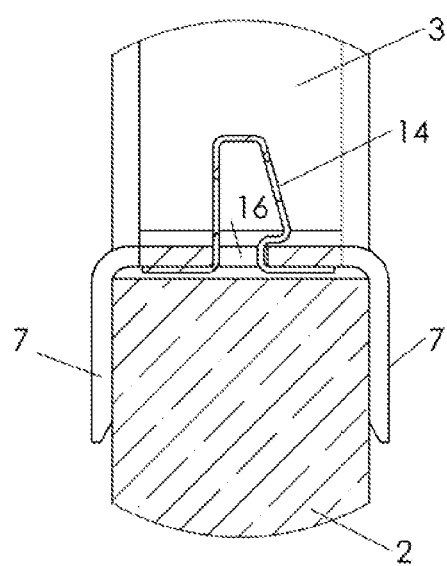
FIG. 6 is a detail section view of a portion of FIG. 5.
Figure 7A:
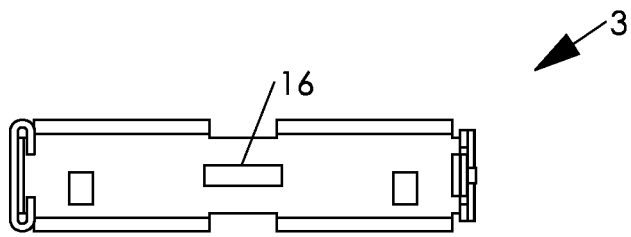
FIG. 7a is a plan view of a frame element of the embodiment of FIG. 5.
Figure 7B:
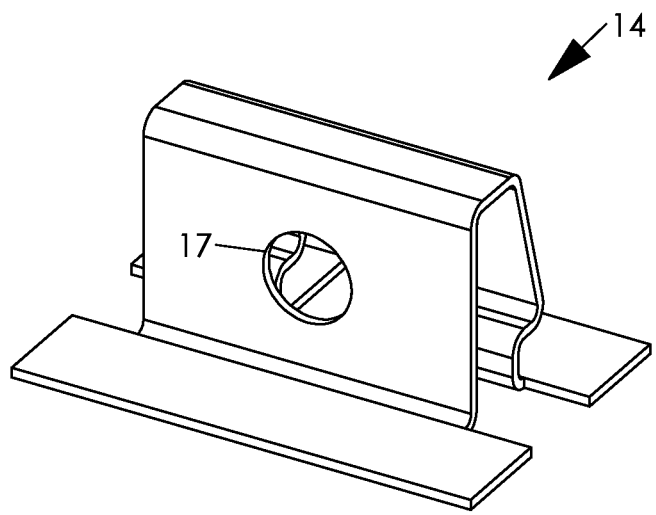
FIG. 7b is a perspective view of a tab coupled to the frame shown in FIG. 5.

FIG. 6 is a section view, along 6'-6' in FIG. 5, of mounting tab 14 installed in frame element 3. FIG. 7a is a plan view of frame element 3. Slot 16 in the frame element 3 is configured to receive mounting tab 14, as can be seen in FIG. 6. The configuration of mounting tab 14 is shown in more detail in the perspective view of FIG. 7b. The flexibility of the sheet metal or like material allows the tab 14 to compress as it is pushed into the slot 16 and once at the appropriate depth it expands and remains captive. Removal of the tab 14 from the slot 16 is possible by compression of the tab with fingers or pliers.

When the frame is installed in the wall opening, as shown in FIG. 6, the base of tab 14 is positioned between the frame element 3 and the wall 2. The mounting portion of tab 14 protrudes within the perimeter of the frame. The wall plate 13, as can be seen in FIG. 5, can be mounted on the frame assembly 1 via two tabs 14 with holes 17 that receive appropriately sized threaded fasteners 15.

Figure 8:
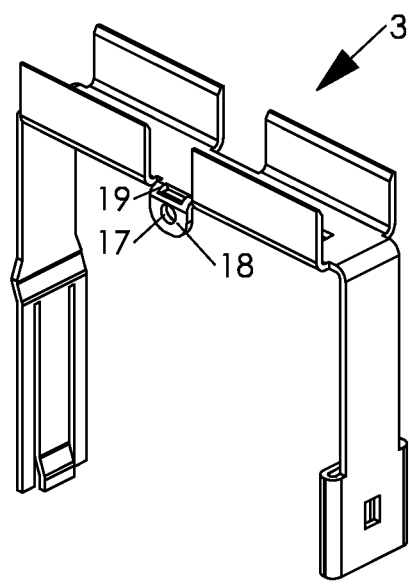
FIG. 8 is a perspective view of a break-away tab integral to a frame such as shown in FIG. 1.

An alternative arrangement for mounting a low voltage device to frame element 3 is illustrated in the perspective view of FIG. 8. Tab 18 is integral to the frame element 3 via a weakened area 19. Hole 17 is provided for receiving an appropriately sized fastener. The tab 18 can be removed when it is not needed, for example, when the frame is to be used for installation of an electrical box. The weakened area 19 material facilitates removal of the tab.

Figure 9:
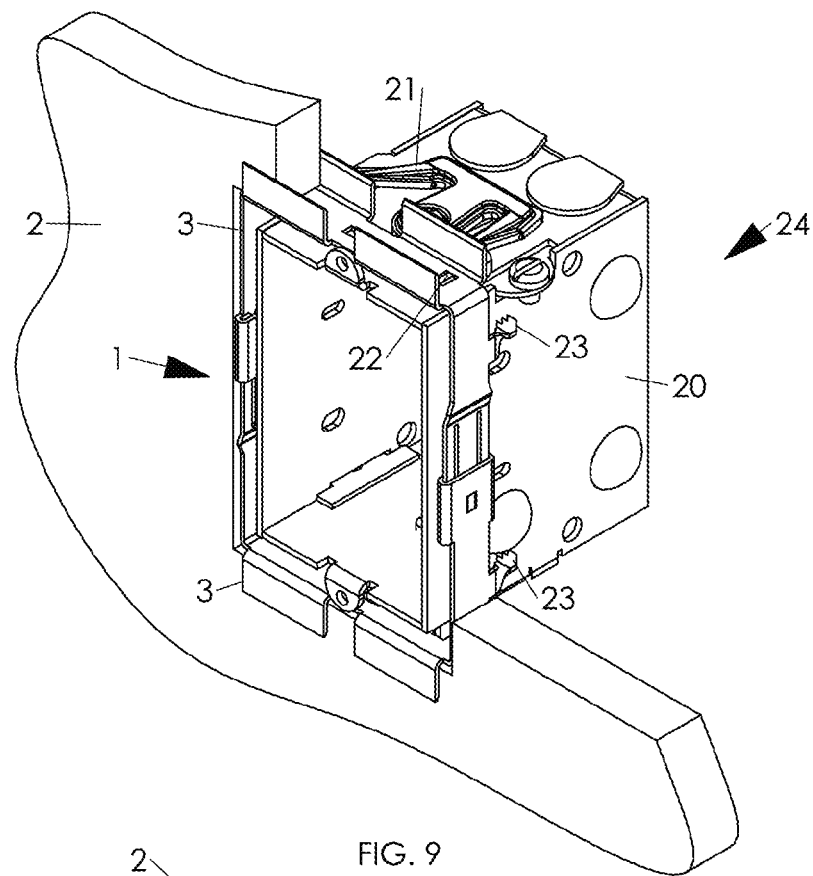
FIG. 9 is a perspective view of a frame assembly coupled with an electrical box.

FIG. 9 exemplifies use of frame assembly 1 for mounting an electrical box assembly 24. The frame assembly 1 has been expanded and locked to fit into the opening in the drywall 2 as described above with respect to FIGS. 1-4. Upper and lower frame elements 3 include holes 26 in their top and bottom sides, respectively. The sides of upper and lower frame elements 3 have formed thereon barbed elements 23 that extend in a direction inward of the wall opening. Assembly 24 comprises electrical box 20 and spring clip 21. Spring clip 21, integral with electrical box 20, is shown in more detail in an exploded view in FIG. 12. As shown, spring clip 21 can be fixed to the electrical box 20 by screw 27. Arms of spring clip 21 terminate in teeth 22. As an alternative to a threaded hole in box 20 for receiving screw 27, the clip can be formed as an integrated portion of the top and bottom surfaces of the electrical box. In either alternative, spring clip 21 is integral with electrical box 20 prior to its mounting in frame assembly 1.

Figure 10:
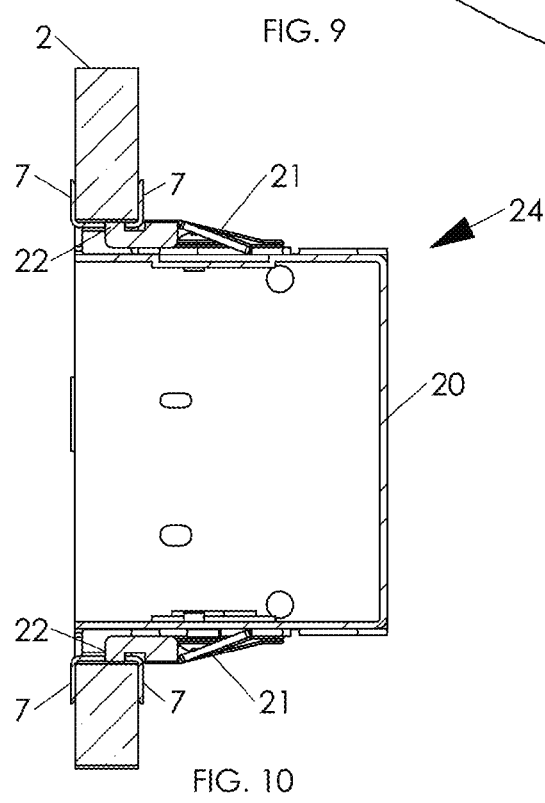
FIG. 10 is a section view of the assembly shown in FIG. 9.
Figure 11:
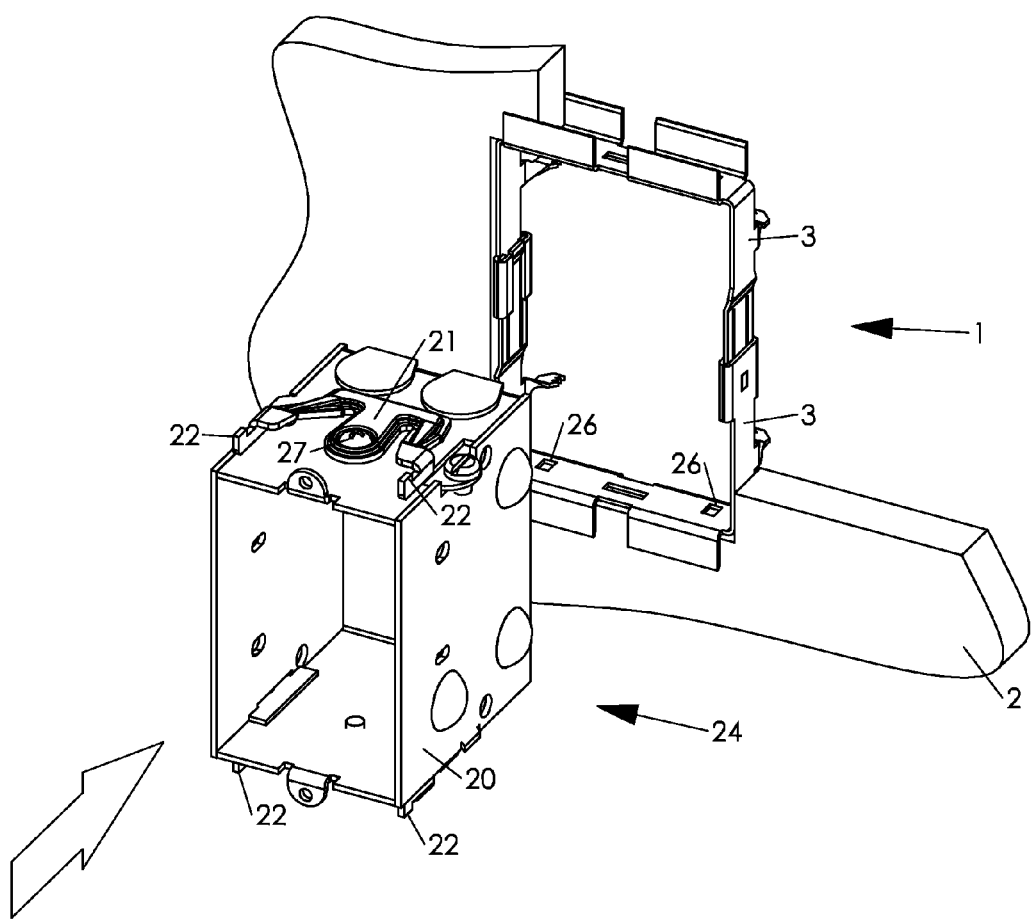
FIG. 11 is an exploded view of the assembly shown in FIG. 9.
Figure 12:
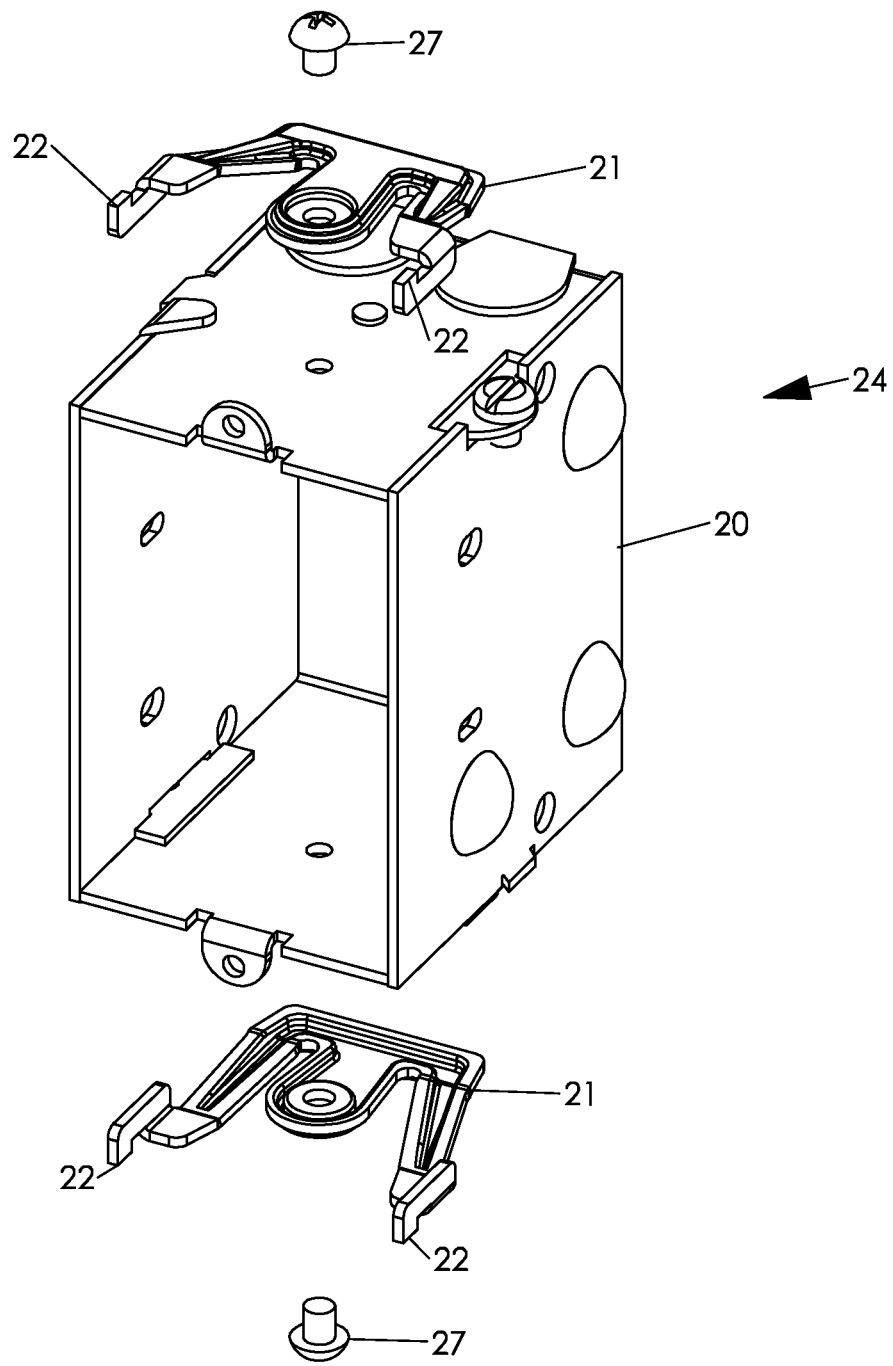
FIG. 12 is an exploded view of the electrical box assembly shown in FIG. 9.

As the electrical box assembly 24 is inserted into the frame assembly 1, the sprung clips 21 are compressed toward the box 20. In the illustration of FIG. 12, spring clip 21 on the upper surface of box 20 is compressed downwardly and the spring clip on the lower surface of box 20 is compressed upwardly. Once the box assembly 24 has been inserted sufficiently, as shown in FIG. 9, the clips 21 are then free to spring up and allow teeth 22 to fit into holes 26 located on either side of the top and bottom of the frame assembly 1, fixing the box into position. While holes 26 are shown as being rectangular shaped, other shapes can be used. As the box assembly 24 is inserted, barbed elements 23, integral to the frame, apply pressure on the wall of the box 20, electrically grounding the frame when the box is grounded with a wire. The barbed elements 23 can also provide centering when electrical boxes are used in a frame assembly. FIG. 10 is a side view showing electrical box 20 inserted into the frame assembly 1 and the opening of wall 2. The box 20 is now ready for installation of an electrical devise and wall plate.

Figure 13:
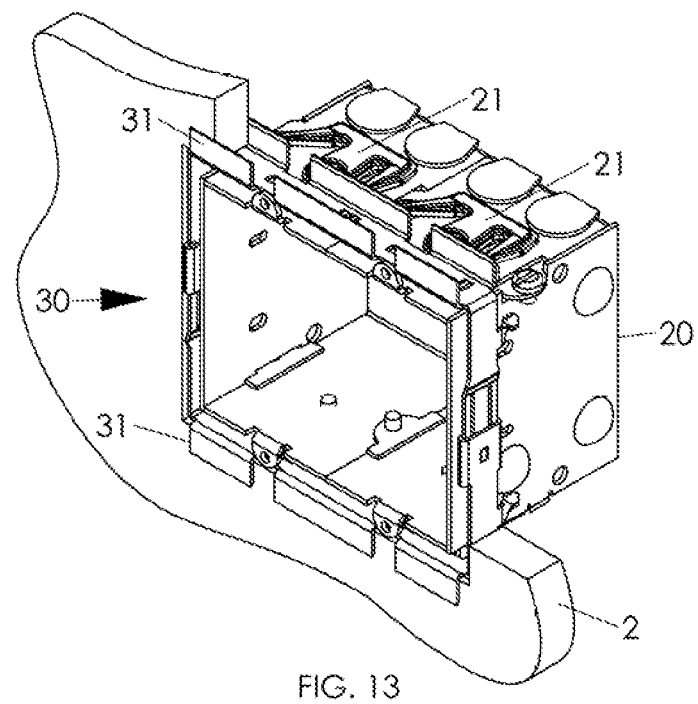
FIG. 13 is a perspective view of a frame assembly coupled with a two gang electrical box.
Figure 14:
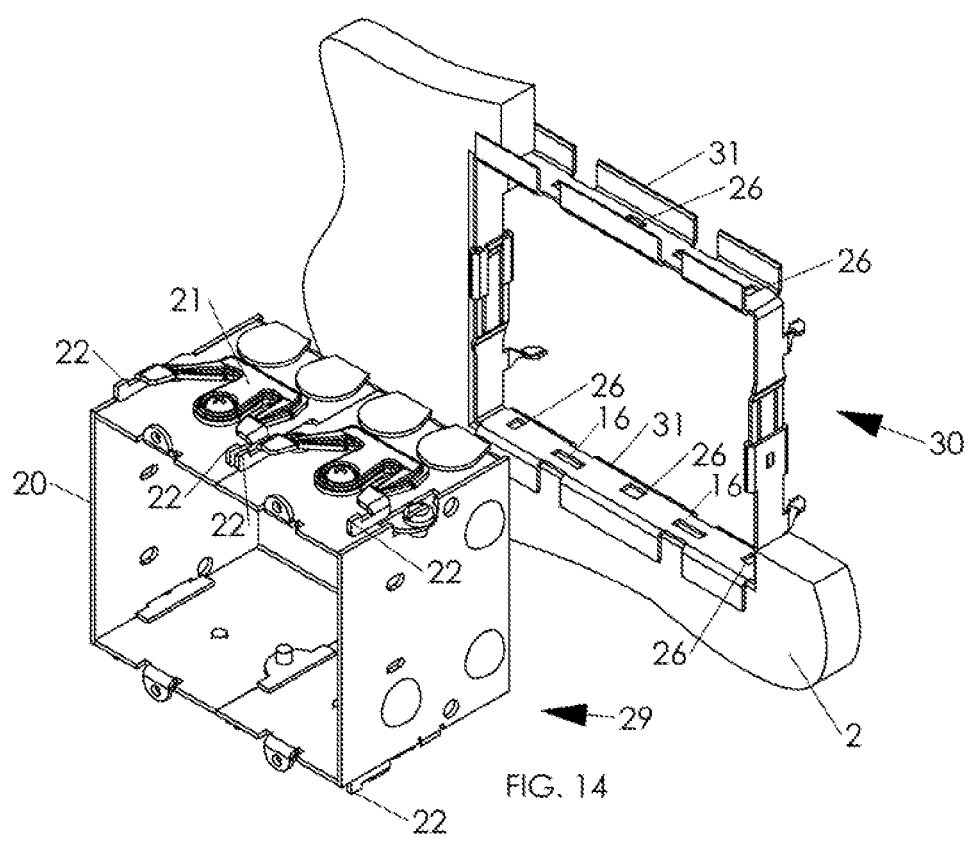
FIG. 14 is an exploded view of the embodiment shown in FIG. 13.

Frame assembly 1 can be configured to accommodate a ganged electrical box to be mounted in an appropriately sized wall opening, as illustrated in the perspective view of FIG. 13 and exploded view of FIG. 14. A two gang electrical box assembly 29 is mounted in a wider frame assembly 30. The wider frame elements 31 may be formed with additional flanges as appropriate for positioning the frame assembly in the wall opening and wedging the wall to the frame assembly.

In a manner similar to the embodiment of FIGS. 9-12, teeth 22 of spring clips 21 mate with holes 26 in frame elements 31 when the ganged electrical box is inserted. As shown, for the two gang electrical box 20, twice the number of spring clips is provided for a corresponding number of holes 26 in the frame assembly. Although a two gang electrical box assembly is exemplified, the frame assembly can be sized to mount an electrical box having any number of ganged electrical components. Alternatively, the frame assembly can be sized to accommodate a combination of a single box and low voltage device, or ganged boxes and low voltage devices. When a low voltage device is used, the mounting tabs 14 of FIG. 5 would be inserted in respective slots 16.

Figure 15:
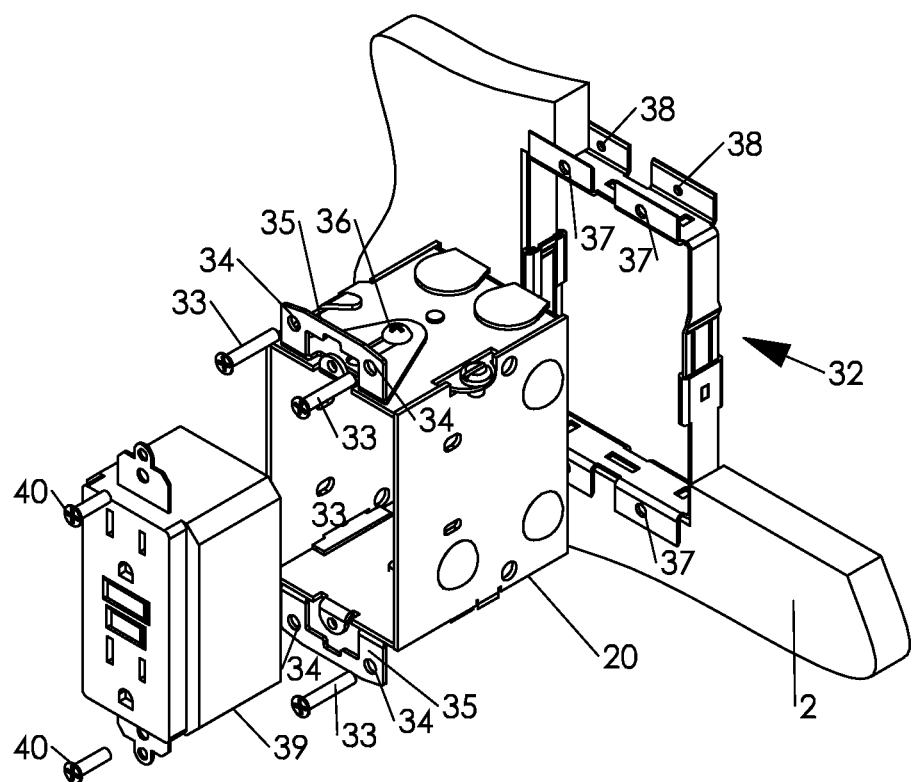
FIG. 15 is an exploded perspective view of an alternative embodiment of a frame assembly coupled with an electrical box.

FIG. 15 is an exploded perspective view of an alternative embodiment of the frame assembly of FIG. 9 wherein an electrical box 20 can be mounted to frame assembly 32 using threaded fasteners. Holes 37 and 38 are provided in the outer and inner frame assembly flanges. Holes 37 and 38 are in alignment for correspondence with holes 34 in ears 35 located on the top and bottom of the electrical box 20. Holes 38 are tapped for engagement with threaded fastener 33. Holes 37 are clearance holes for the fasteners 33. Clearance holes also are provided in wall substrate. The fastener length is sized for attachment of ears 35 of the box to the flange holes 38 through the wall substrate. An electrical outlet 39 is shown with threaded fasteners 40 which mount it to the electrical box 20. The box 20 can instead be used to house other electrical components, such as switches and the like.

Figure 16A:
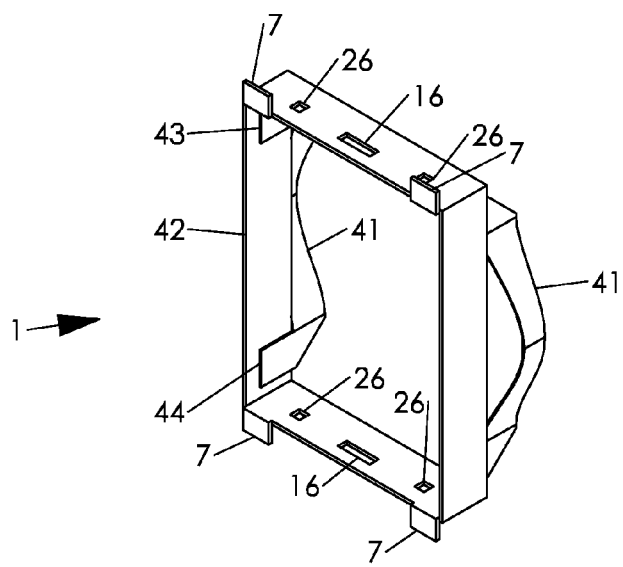
FIGS. 16a-16c exemplify an alternative frame assembly arrangement.
Figure 16B:
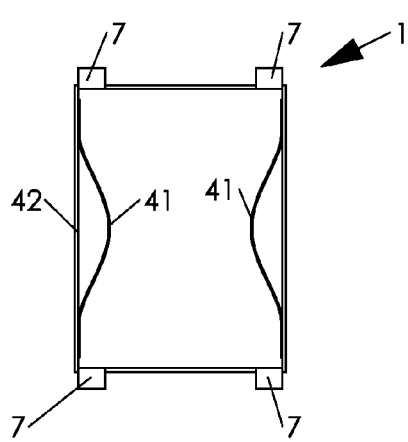
Figure 16C:
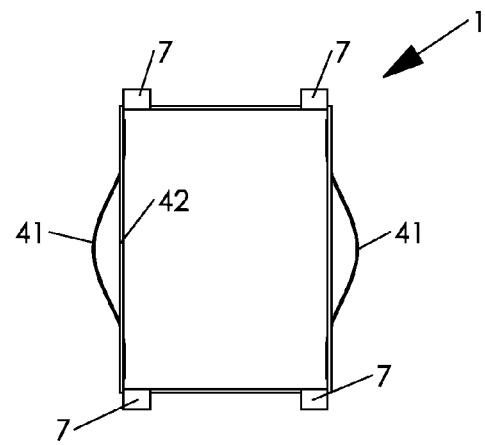

FIGS. 16a through FIG. 16c exemplify an alternative frame assembly 1 for mounting an electrical component in a wall opening. Frame 42 is a unitary structure dimensioned with a perimeter corresponding to the contour of a substrate wall opening such as shown in FIG. 4. Flanges 7 are shown at the top and bottom of the outer wall side of the frame 42. Leaf spring elements 41 are attached to the inner sides of frame 42 at the top portion 43 and bottom portion 44, for example, by welding. These spring elements can be made of metal or any suitable material.

Each spring element 41 is longer than the frame 42 is high so that the spring element can flex inwardly toward the center of the frame 42 as seen in FIG. 16b or outwardly as seen in FIG. 16c. An external force, such as finger pressure, is required to move the element 41 from the inward position to the outward position and vice versa. Before insertion of the frame in the wall opening, spring elements 41 are biased to the inside of the frame as shown in FIG. 16b. In this configuration, the frame assembly 1 can be inserted in the opening in the wall with flanges 7 abutting the outer wall surface. Outward pressure can then be applied to the spring elements 41. Once biased to the outside, the middle portions of the spring elements overlap the backside of the wall and retain the frame in the opening.

Additional flanges may be located at the top and/or bottom of the inner wall side of the frame. Although not illustrated, any of the arrangements for mounting an electrical component mounting to the frame, as previously described above with respect to FIGS. 1-15, can be utilized with frame 42.

Figure 17A:
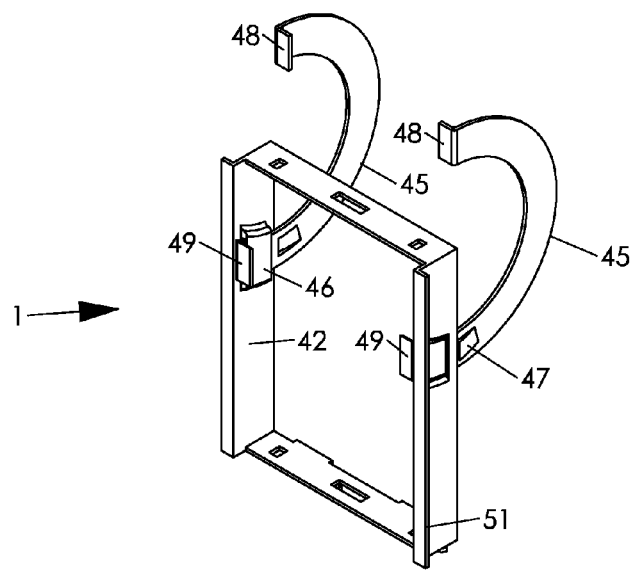
FIGS. 17a-17d exemplify another alternative frame assembly arrangement.

FIG. 17a is a perspective view of another alternative frame assembly 1 for mounting an electrical component in a wall opening. Frame 42 is a unitary structure dimensioned with a perimeter corresponding to the contour of a substrate wall opening such as shown in FIG. 4. Side views of FIGS. 17-17d are illustrative of positions of installation. As in the arrangement of FIG. 16a, Frame 42 is a unitary structure dimensioned with a perimeter corresponding to the contour of a substrate wall opening such as shown in FIG. 4. Flanges 50 extend from the bottom edge of frame 42 at the inner side of the wall substrate and have a curvature at the distal end to facilitate insertion of the frame 42 into the substrate wall opening. Flanges 51, along the side edges of the frame extend outward to overlap the outer side of the wall substrate. A channel track 46 is formed on each inner side of the frame 42. A curved retainer 45 is held within each channel track 46 and is slidable therein relative to the frame 42. Retainer 45 terminates at surface 49 at the outer wall side of channel track 46 and terminates at surface 48 at the inner wall side of channel track 46. A spring barb 47 is formed on the outer side of retainer 45 proximate surface 49. Retainer 45 may be comprised of sheet metal having a springable functionality that permits barb 48 to traverse the channel 46.

Figure 17B:
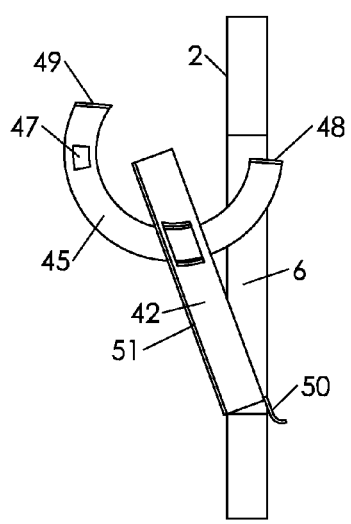

FIG. 17*b* is a side view of the frame assembly 42 as it is about to be inserted into the wall opening. Each curved retainer 45 is situated in the corresponding channel track 46 at a position intermediate the end surfaces 48 and 49. Upon insertion, the bottom side of the frame is positioned at an angle with the bottom side of the wall opening such that flanges 50 are in contact with the inner edge thereof. The frame is then rotated to the position shown in FIG. 17*c* until flanges 51 are in contact with the outer surface of the wall substrate. Flanges 50 and 51 sandwich the wall substrate. Pressure is then applied to surfaces 49 to slide the retainers in the track 46 until surfaces 48 apply pressure against the backside of the drywall 2 and the spring barbs 47 engage the back side of frame 42 and retain the frame assembly 1 in position as seen in FIG. 17*d*.

Figure 17C:
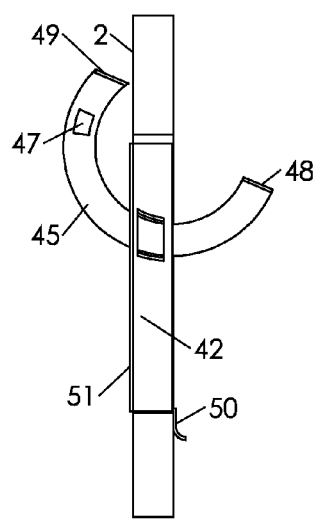
Figure 17D:
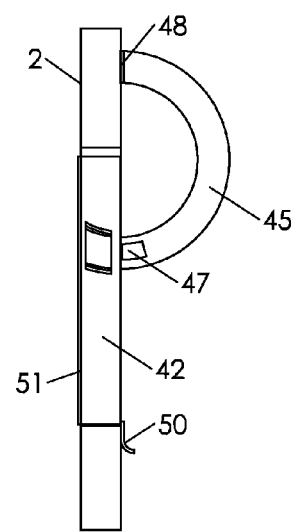
Figure 18A:
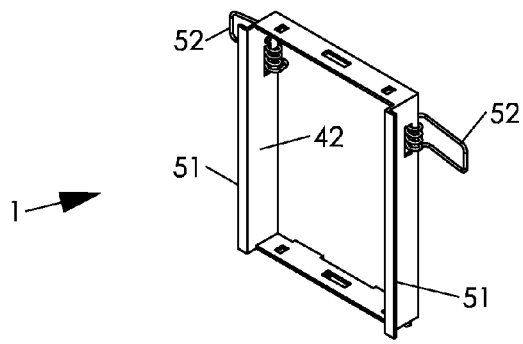
FIGS. 18a-18c exemplify another alternative frame assembly arrangement.
Figure 18B:
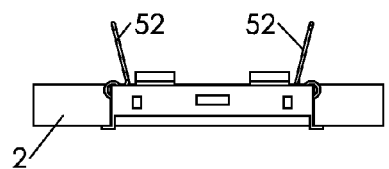
Figure 18C:
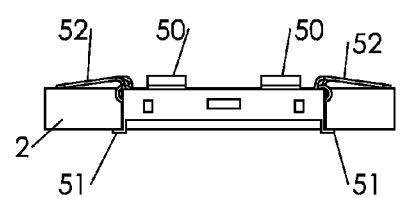

FIGS. 18*a* through FIG. 18*c* exemplify an alternative frame assembly 1 for mounting an electrical component in a wall opening. Frame 42 is a unitary structure dimensioned with a perimeter corresponding to the contour of a substrate wall opening such as shown in FIG. 4. Flanges 51, along the side edges of the frame extend outward to overlap the outer side of the wall substrate. Flanges 50 extend from the bottom edge of frame 42 at the inner side of the wall substrate. An outwardly biased coil spring arm 52 is captured near the top of each side of the frame as shown in the perspective view of FIG. 18*a*. In the manner described above with respect to the arrangement of FIG. 17, the frame is rotated into position in the wall opening at its bottom side, whereby opposing flanges 50 and 51 compress the wall substrate. The upper portion of the frame is inserted into the opening 6 by compressing the outwardly biased coil spring arms 52, a position shown in FIG. 18*b*. Once the front flange 51 is against the drywall the coil spring arms 52 are released to spring to the position shown in FIG. 18*c*. Coil spring arms 52 then apply pressure on the backside of the drywall 2 against the front flange 51 of the frame 42 to secure the frame in position.

Figure 19A:
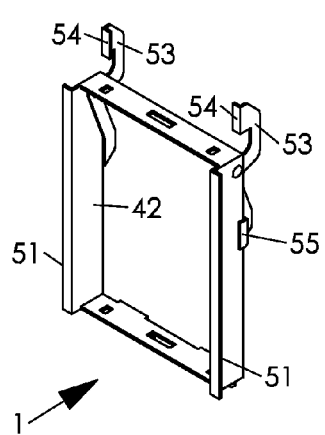
FIGS. 19a-19c exemplify another alternative frame assembly arrangement.
Figure 19B:
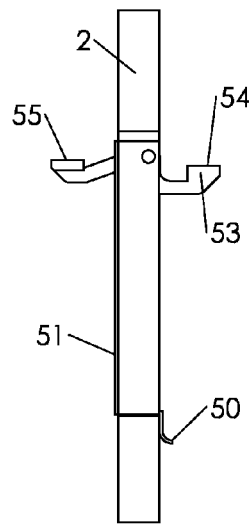
Figure 19C:
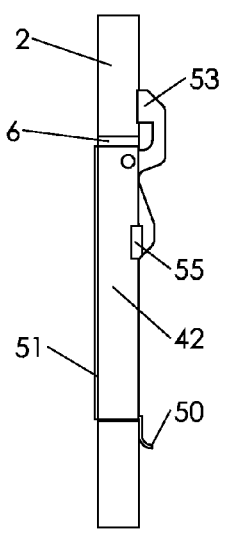

FIGS. 19*a* through FIG. 19*c* exemplify an alternative frame assembly 1 for mounting an electrical component in a wall opening. Frame 42 is a unitary structure dimensioned with a perimeter corresponding to the contour of a substrate wall opening such as shown in FIG. 4. Flanges 51, along the side edges of the frame extend outward to overlap the outer side of the wall substrate. Flanges 50 extend from the bottom edge of frame 42 at the inner side of the wall substrate. A retainer arm 53 is affixed about a pivot point in each side of frame 42, as shown in the perspective view of FIG. 19*a*. Retainer arm 53 terminates at opposite end surfaces 54 and 55. Retainer arm 53 may be comprised of sheet metal having a springable functionality.

In the manner describe above with respect to FIGS. 17*a*-17*c*, opposing flanges 50 and 51 compress the drywall 2 as frame 42 is rotated into position about the lower edge of the opening in the drywall 2. As shown in the side view of FIG. 19*b*, upon insertion of the frame in the wall opening 6, the arms 53 are relatively balance in a position generally perpendicular to the frame 42. Surface 55 projects outwardly from the wall while surface 54 projects inwardly. To retain the upper portion of frame 42 to the wall, the outwardly projecting ends of the arms 53 are rotated down into the frame. The opposite end 54 is thus rotated upwardly to apply pressure on the backside of the drywall 2, while applying a compression force to the wall against the front flange 51 of the frame 42. The arm 53 is locked into position by twisting the arm 53 and hooking the lower end 55 around the edge of the frame 42, as shown in FIG. 19*c*.

FIGS. 20*a* through FIG. 20*e* exemplify an alternative frame assembly 1 for mounting an electrical component in a wall opening. Frame 42 is a unitary structure dimensioned with a perimeter corresponding to the contour of a substrate wall opening such as shown in FIG. 4. Flanges 51, along the side edges of the frame extend outward to overlap the outer side of the wall substrate. Flanges 56 extend from the bottom edge of frame 42 at the inner side of the wall substrate. Flanges 56 are comprised of flexible material to accommodate variations in thickness of the wall substrate. Arms 57 are pivotable about axis 58 on each inner side of frame 42, as shown in the perspective view of FIG. 20*a*. The arms 57 each comprise a surface portion that is perpendicular to the axis and a flange portion that is substantially parallel to the plane of the wall. The flange portion terminates in a curved surface 59.

Figure 20A:
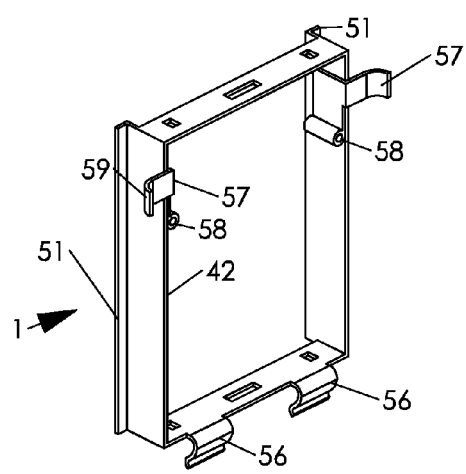
FIGS. 20a-20f exemplify another alternative frame assembly arrangement.
Figure 20B:
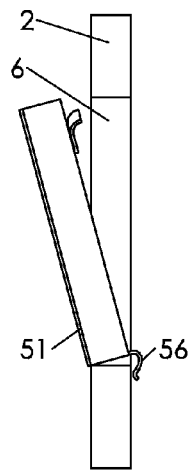
Figure 20C:
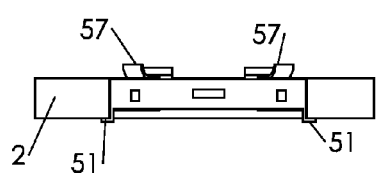
Figure 20E:
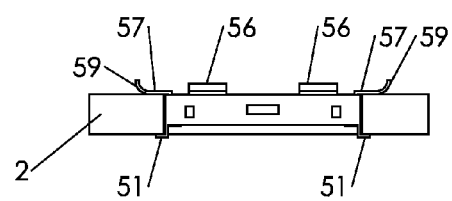
Figure 20D:
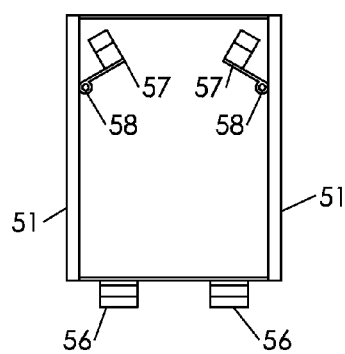
Figure 20F:
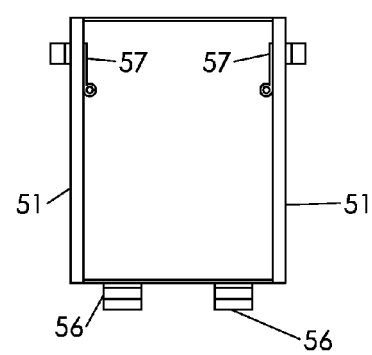

FIG. 20*b* is a side view of the frame assembly 42 as it is about to be inserted into the wall opening. The bottom side of the frame is positioned at an angle with the bottom side of the wall opening such that flanges 56 are in contact with the inner edge thereof. The frame is then rotated to the position shown in the side view of FIG. 20*c* until flanges 51 are in contact with the outer surface of the wall substrate. Flanges 56 and 51 sandwich the wall substrate. At this time arms 57 are pivoted inwardly toward the center of the frame to clear the wall opening, as can be seen more readily in the plan view of FIG. 20*d*. To retain the upper portion of frame 42 to the wall, the arms 57 are rotated outwardly and ramp up on the sloped surface 59 of the arm onto the drywall 2 and apply pressure on the backside of the drywall 2 compressing it against the front flange 51 of the frame 42, as shown in the side view of FIG. 20*e* and plan view of 20*f*.

FIGS. 21*a* through FIG. 21*e* exemplify an alternative frame assembly 1 for mounting an electrical component in a wall opening. Frame 42 is a unitary structure dimensioned with a perimeter corresponding to the contour of a substrate wall opening such as shown in FIG. 4. As shown in the perspective view of FIG. 21*a*, upper and lower sliders 60 are coupled to the sides of frame 42 via channel portions 63. Unitary to the sliders are flanges 7 that extend vertically, similar to the configuration of flanges 7 of FIG. 1. The channels permit movement of the sliders in the vertical direction. Holes 62 in the slider walls can mate with dimples 61 on the frame side walls to prevent inadvertent slider movement.

Before insertion of the frame 42 in the wall opening, the sliders are located in the compressed vertical positions illustrated in the plan view of FIG. 21*b*. As the flanges 7 are within the periphery of the frame 42, the frame 42 can then be directly inserted in the wall opening 6, as shown in the side view of FIG. 21*c*. Once in position, sliders are extended to their maximum vertical distance as shown in the plan view of FIG. 21*d*. This slider positioning can be maintained by appropriately mating holes 61 in the sliders with the dimples 61 on the frame walls. In this extended position, opposing flanges 7 sandwich the drywall as shown in the side view of FIG. 21*e*.

Figure 22A:
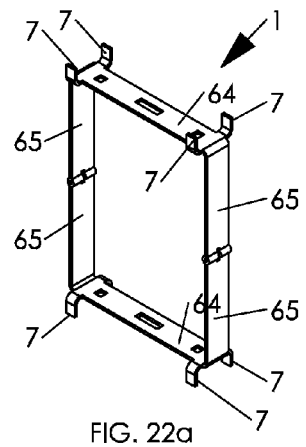
FIGS. 22a-22c exemplify another alternative frame assembly arrangement.
Figure 22B:
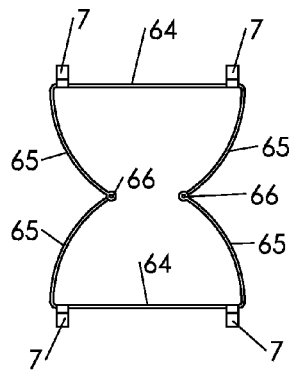
Figure 22C:
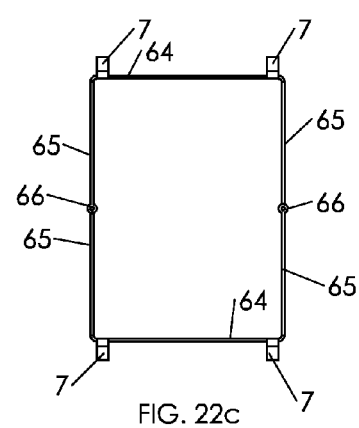

FIGS. 22a through FIG. 22c exemplify an alternative frame assembly 1 for mounting an electrical component in a wall opening. Two frame elements 64 have legs 65 that are hinged together at axes 66, as depicted in the perspective view of FIG. 22a. The perimeter of frame elements 64 correspond to the contour of a substrate wall opening such as shown in FIG. 4. Flanges 7 extend vertically, similar to the configuration of flanges 7 of FIG. 1. To insert the frame in the wall opening, inward pressure is applied to legs 65 at axis 66, which then flex inwardly as shown in the side view of FIG. 22b. The height of the frame is thereby reduced so that the flanges 7 are within the periphery of the wall opening contour. Once positioned in the opening, the legs 65 are released, they return to their vertical extent to force the opposing flanges 7 on the upper and lower ends of the frame assembly 1 to sandwich the wall substrate.

Figure 23A:
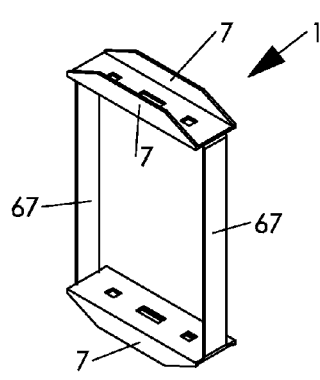
FIGS. 23a-23c exemplify another alternative frame assembly arrangement.
Figure 23B:
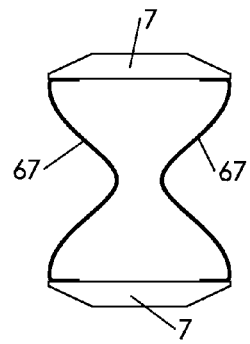
Figure 23C:
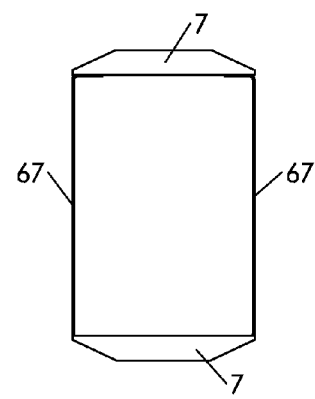

FIG. 23a through FIG. 23c exemplify an alternative frame assembly 1 for mounting an electrical component in a wall opening. As shown in perspective view in FIG. 23a, the frame assembly comprises sidewalls 67. Top and bottom sides are formed with flanges 7 that extend in the vertical direction. Sidewalls 67 are comprised of spring metal material. To insert the frame assembly into a corresponding opening in a wall substrate, sidewalls 67 are squeezed together to reduce the height of the frame assembly 1, as shown in the plan view of FIG. 23b. The flanges 7 will then be within the periphery of the wall opening contour to permit insertion in the wall opening. Once positioned in the opening, the sidewalls 67 are released to return to their vertical extent, forcing the opposing flanges 7 on the upper and lower ends of the frame assembly 1 to wedge onto the wall, as shown in FIG. 23c.

Figure 24A:
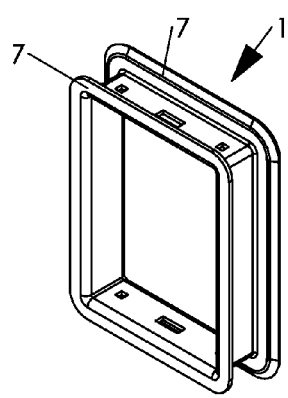
FIGS. 24a-24b exemplify another alternative frame assembly arrangement.
Figure 24B:
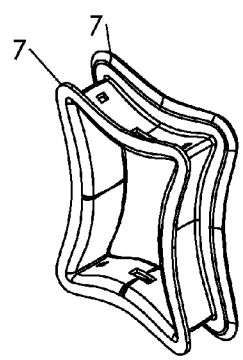

FIG. 24a and FIG. 24b exemplify an alternative frame assembly 1 for mounting an electrical component in a wall opening. Frame 1 is of unitary elastomeric construction with flanges 7 extending outwardly from the perimeter at opposite sides, as shown in the perspective view of FIG. 24a. To insert the frame 1 into a corresponding opening in a wall substrate, compression can be applied to the sides of the frame to reduce the peripheral area and allow clearance of the flanges 7. The reduced configuration is depicted in the perspective view of FIG. 24b. After insertion, the compression force is released, thereby permitting the frame to expand to the original position and wedge the opposing flanges 7 onto the perimeter of the opening in the wall substrate.

Figure 25A:
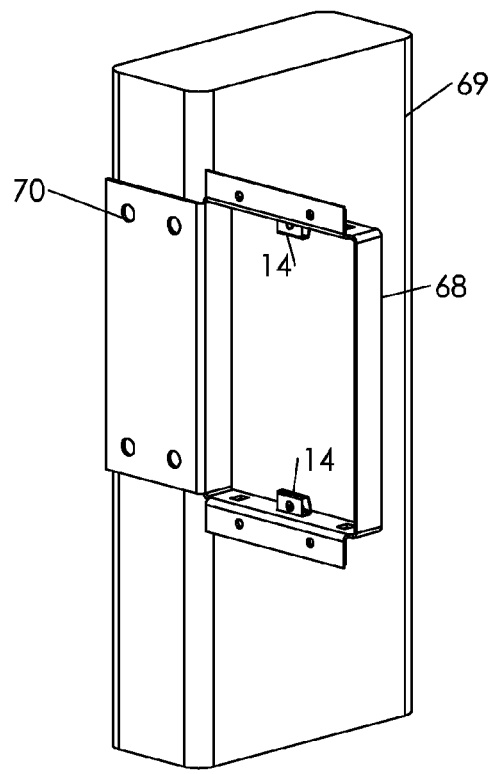
FIGS. 25a-25c exemplify an embodiment for a stud mounted frame for mounting of low voltage devices and electrical boxes.

FIG. 25a shows a frame 68 mounted to a wall stud 69 with telecom tabs 14, as shown in FIG. 5 through 7b. Nails or screws through holes 70 fasten the frame 68 to the stud 69 during the rough-in stage of construction or renovation, prior to erection of the drywall.

Figure 25B:
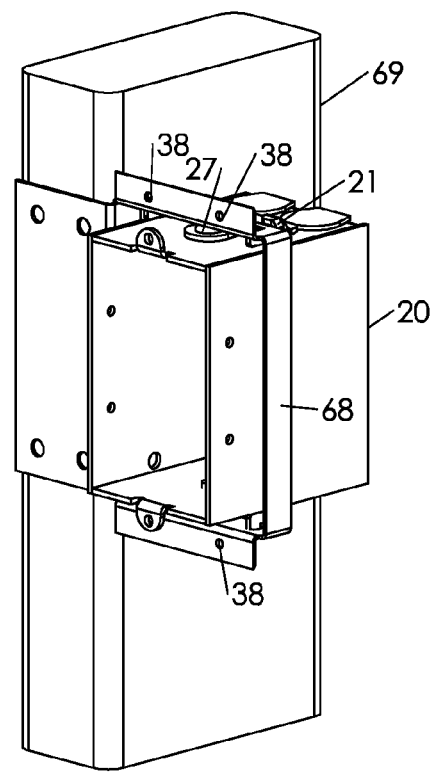

FIG. 25b shows the stud mounted frame 68 of FIG. 25a with an electrical box 20 mounted thereto. Box 20 is mounted using sprung clips 21, such as shown in FIG. 9 through FIG. 14, secured to the bottom and top of the box 20; for example, with threaded fasteners 27. Also visible are tapped holes 38 to receive screws through ears of electrical boxes, also shown in FIG. 15, in the absence of spring clips.

Figure 25C:
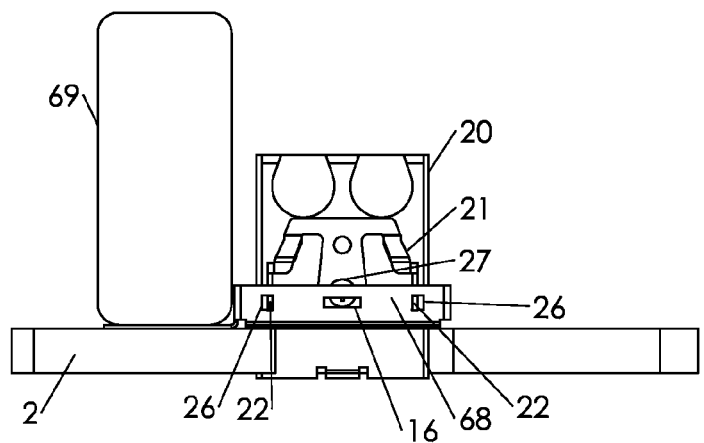

FIG. 25c shows the frame 68, electrical box 20, spring clip 21 and fastener 27 of FIG. 25b in plan view with the drywall 2 shown. The box 20 extends from the frame 68 so that the box 20 is flush with the front of the drywall 2. Also visible are the sprung clip teeth 22 in the holes 26, also shown in FIG. 11, of the frame 68, as well as a slot 16 in the frame 68 to accept a telecom tab.

Figure 26A:
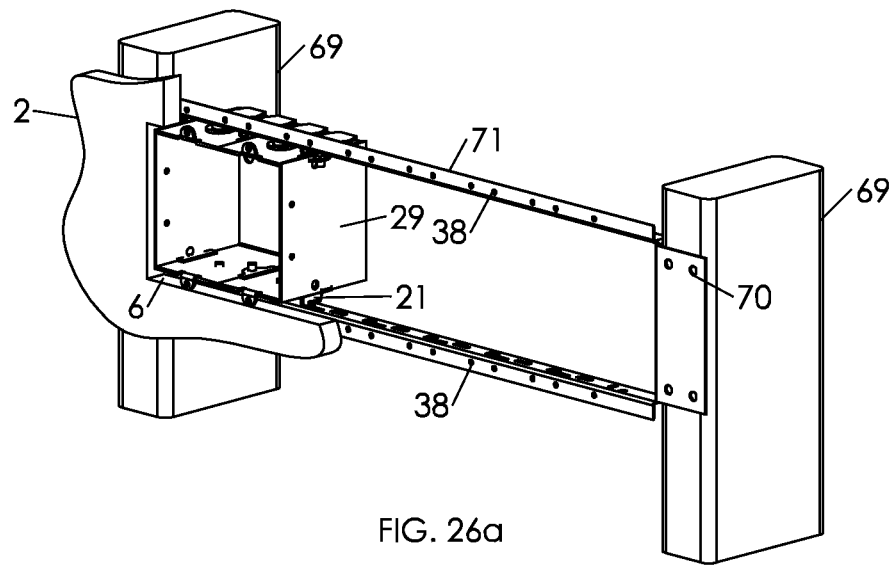
FIGS. 26-26f exemplify an alternative embodiment to the embodiment of FIGS. 25a-25c.
Figure 26B:
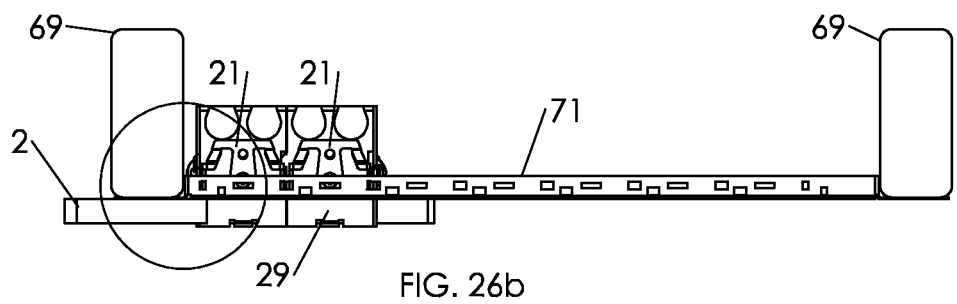
Figure 26C:
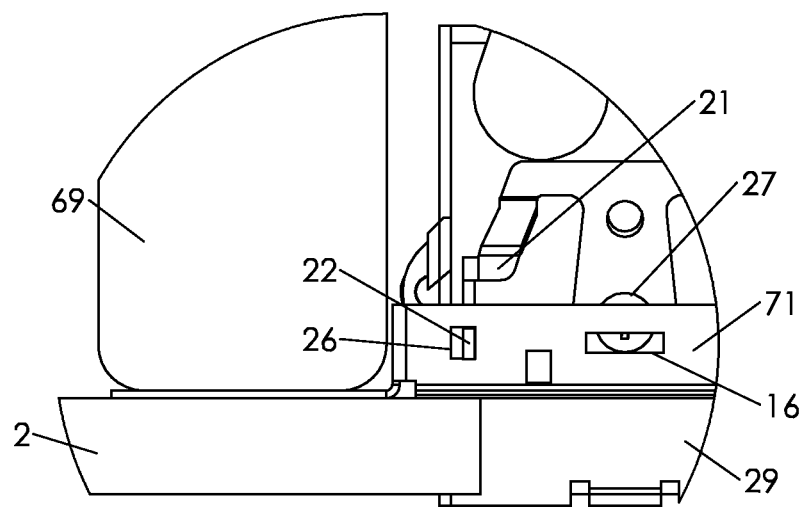

FIG. 26a, FIG. 26b and detail FIG. 26c show a multi-gang frame 71 mounted on two studs 69 spaced at industry standard center to center distance with a two gang electrical box assembly 29 mounted therein. Nails or screws through holes 70 fasten the frame 71 to the studs 69. The box assembly 29 is mounted using sprung clips 21, such as shown in FIG. 9 through FIG. 14, with threaded fasteners 27. Also visible are tapped holes 38 to receive screws through ears of electrical boxes, also shown in FIG. 15, in the absence of sprung clips. A cutaway sheet of drywall 2 is shown in front of the frame 71 and flush with the front of the electrical box 20. The opening 6 in the drywall 2 can be cut to accommodate the number of boxes or telecom plates that are installed in the frame up to a maximum of 7 in this embodiment. Also visible are the sprung clip teeth 22 in the rectangular holes 26, also shown in FIG. 11, of the frame 71, as well as a slot 16 in the frame 71 to accept a telecom tab.

Figure 26D:
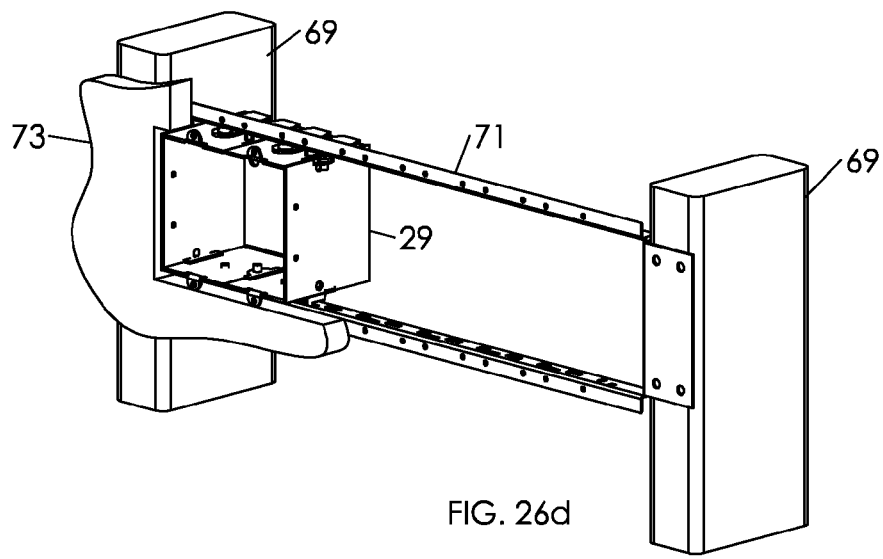
Figure 26E:
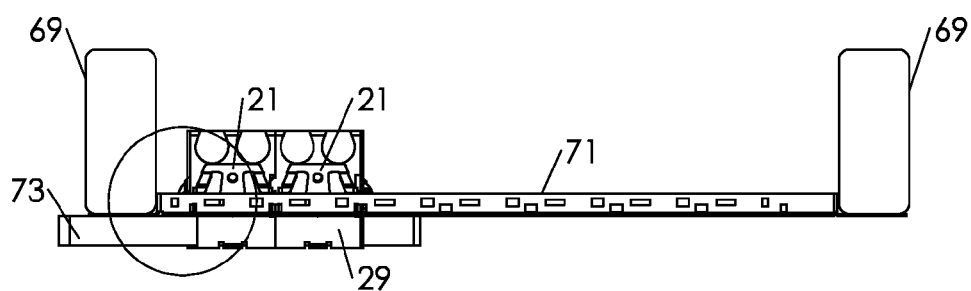
Figure 26F:
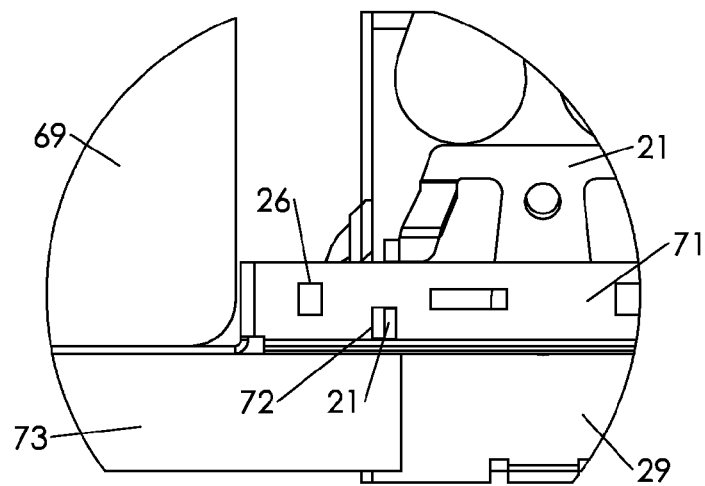

FIG. 26d, FIG. 26e and detail FIG. 26f show the stud 69 mounted multi-gang frame 71 shown in FIG. 26a, FIG. 26b and FIG. 26c with the same two gang electrical box assembly 29 mounted for thicker drywall 73 than in the previous figures. In order for the front of the electrical box assembly 29 to be flush with the thicker drywall 73, the box assembly 29 is shifted so the sprung clip teeth 22 engage rectangular holes 72 in the frame 71 which are positioned forward of the rectangular holes 26 for the thinner drywall.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, any of the various disclosed arrangements for mounting the components may be utilized with the frame assemblies described in FIGS. 16-24. Although threaded fasteners have been illustrated in some of the drawing figures for attachment to the mountings, it should be understood that other well known fastening means are contemplated in lieu thereof.

What is claimed is:

1. A self-supporting apparatus for placement in an opening in an existing building wall having generally planar outer and inner surfaces separated by a thickness dimension, the apparatus comprising:
    a frame having a perimeter configured for contact with the wall opening in the planar direction; and
    a plurality of flange members spaced from each other in a direction of the thickness of the wall, the flange members extending in the planar direction from the frame perimeter for contact with the outer and inner surfaces, respectively, of the building wall, wherein
    the frame further comprises first and second U-shaped elements, each U-shaped element having a channel portion and a tongue portion on an opposite sides of the frame, the tongue portion of each U-shaped element in slidable nesting relationship with the channel portion of the respective other U-shaped element.

2. Apparatus as recited in claim 1, wherein the frame further comprises a mounting portion for mounting an electrical component thereto within the wall opening.

3. Apparatus as recited in claim 2, wherein the mounting portion is configured to support an electrical box.

4. Apparatus as recited in claim 3, wherein the frame further comprises protruding elements configured for contact with the electrical box, thereby positioning the electrical box with respect to the frame.

5. Apparatus as recited in claim 3, wherein the mounting portion comprises apertures in the frame for engagement with a spring clip integral with the electrical component.

6. Apparatus as recited in claim 5, wherein the mounting portion comprises a plurality of apertures, the frame configured to receive a plurality of electrical boxes for engagement with the apertures.

7. Apparatus as recited in claim 1, wherein each of the U-shaped elements comprises a detent at one side of the frame and a hole at the opposite side of the frame, wherein the detents of the first and second U-shaped elements are engaged with the holes of each other when the U-shaped elements are in expanded positions to mate the frame with the building wall.

8. A self-supporting apparatus for placement in an opening in an existing building wall having generally planar outer and inner surfaces separated by a thickness dimension, the apparatus comprising:
   a frame having a perimeter configured for contact with the wall opening in the planar direction; and
   a plurality of flange members spaced from each other in a direction of the thickness of the wall, the flange members extending in the planar direction from the frame perimeter for contact with the outer and inner surfaces, respectively, of the building wall;
   wherein:
   the perimeter of the frame comprises a side formed continuously along an enclosed perimeter entirety, the side comprising front and back edges separated by a distance corresponding to the thickness dimension of the wall; and
   the plurality of flange members extend respectively from the front and back edges, outwardly from the perimeter.

9. Apparatus as recited in claim 8, wherein each of the flange members comprises a continuous plane along its entire extent.

10. Apparatus as recited in claim 8, wherein the perimeter comprises a rectangular configuration.

11. Apparatus as recited in claim 1, wherein
   the perimeter of the frame comprises a side formed continuously along an enclosed perimeter entirety, the side comprising front and back edges separated by a distance corresponding to the thickness dimension of the wall; and
   the plurality of flange members extend respectively from the front and back edges, outwardly from the perimeter.

12. Apparatus as recited in claim 11, wherein each of the flange members comprises a continuous plane along its entire extent.

* * * * *